US012357849B2

(12) United States Patent
Walker

(10) Patent No.: US 12,357,849 B2
(45) Date of Patent: Jul. 15, 2025

(54) PERSONAL RESPIRATORY PROTECTION DEVICE

(71) Applicant: 3M INNOVATIVE PROPERTIES COMPANY, St. Paul, MN (US)

(72) Inventor: Garry J. Walker, Stockton-on-Tees (GB)

(73) Assignee: 3M Innovative Properties Company, St. Paul, MN (US)

(*) Notice: Subject to any disclaimer, the term of this patent is extended or adjusted under 35 U.S.C. 154(b) by 857 days.

(21) Appl. No.: 17/573,684

(22) Filed: Jan. 12, 2022

(65) Prior Publication Data

US 2022/0134139 A1 May 5, 2022

Related U.S. Application Data

(63) Continuation of application No. 14/912,191, filed as application No. PCT/US2014/050853 on Aug. 13, 2014, now Pat. No. 11,241,595.

(30) Foreign Application Priority Data

Aug. 20, 2013 (GB) ...................................... 1314886

(51) Int. Cl.

| | |
|---|---|
| ***A62B 18/02*** | (2006.01) |
| ***A62B 18/08*** | (2006.01) |
| ***A62B 23/02*** | (2006.01) |

(52) U.S. Cl.

CPC ............ *A62B 18/02* (2013.01); *A62B 18/082* (2013.01); *A62B 18/084* (2013.01); *A62B 23/025* (2013.01)

(58) Field of Classification Search

None

See application file for complete search history.

(56) References Cited

U.S. PATENT DOCUMENTS

| | | | |
|---|---|---|---|
| 3,779,244 | A | 12/1973 | Weeks, Jr. |
| 3,888,246 | A | 6/1975 | Lauer |
| 3,890,966 | A | 6/1975 | Aspelin |
| 4,030,493 | A | 6/1977 | Walters |
| 4,319,567 | A | 3/1982 | Magidson |
| 4,384,577 | A | 5/1983 | Huber |
| 4,419,993 | A | 12/1983 | Peterson |
| 4,454,881 | A | 6/1984 | Huber |
| 4,467,073 | A | 8/1984 | Creasy |
| 4,616,647 | A | 10/1986 | McCreadie |
| 4,635,628 | A | 1/1987 | Hubbard |
| 4,739,755 | A | 4/1988 | White |
| 4,790,306 | A | 12/1988 | Braun |
| 4,802,473 | A | 2/1989 | Hubbard |

(Continued)

FOREIGN PATENT DOCUMENTS

| | | |
|---|---|---|
| BR | 9101774 | 11/1992 |
| BR | 9102774 | 1/1993 |

(Continued)

OTHER PUBLICATIONS

International Search Report for PCT International Application No. PCT/US2014/050853, mailed on Dec. 15, 2014, 3pages.

*Primary Examiner* — Bradley H Philips

(57) ABSTRACT

The present invention relates to a personal respiratory protection device, in particular, such a device comprising a respirator body having a periphery, a filter media, forming at least part of the respirator body, and a gasket, the gasket being located at the periphery and extending along at least a portion of its length.

6 Claims, 4 Drawing Sheets

(56) References Cited

U.S. PATENT DOCUMENTS

| | | | |
|---|---|---|---|
| 4,827,924 | A | 5/1989 | Japuntich |
| 4,850,347 | A | 7/1989 | Skov |
| 4,873,972 | A | 10/1989 | Magidson |
| 4,941,470 | A | 7/1990 | Hubbard |
| 5,062,421 | A | 11/1991 | Burns |
| 5,394,568 | A | 3/1995 | Brostrom |
| 5,505,197 | A | 4/1996 | Scholey |
| 5,553,608 | A | 9/1996 | Reese |
| 5,561,863 | A | 10/1996 | Carlson, II |
| 5,619,989 | A | 4/1997 | Kruger |
| 5,701,893 | A | 12/1997 | Kern |
| 5,724,964 | A | 3/1998 | Brunson |
| 5,813,398 | A | 9/1998 | Baird |
| 5,836,303 | A | 11/1998 | Hurst |
| 5,918,598 | A | 7/1999 | Belfer |
| D413,166 | S | 8/1999 | Snow |
| 6,044,842 | A | 4/2000 | Pereira |
| 6,055,982 | A | 5/2000 | Brunson |
| D442,276 | S | 5/2001 | Geist |
| 6,332,465 | B1 | 12/2001 | Xue |
| 6,354,296 | B1 | 3/2002 | Baumann |
| 6,532,598 | B1 | 3/2003 | Cardarelli |
| D478,660 | S | 8/2003 | Mault |
| 6,752,149 | B2 | 6/2004 | Gillespie |
| D493,523 | S | 7/2004 | Barnett |
| 6,817,362 | B2 | 11/2004 | Gelinas et al. |
| 6,988,500 | B1 | 1/2006 | Cox |
| 7,036,507 | B2 | 5/2006 | Jensen |
| 7,210,482 | B2 | 5/2007 | Huang |
| 7,290,545 | B2 | 11/2007 | Kleman |
| D556,901 | S | 12/2007 | Davidson |
| D558,331 | S | 12/2007 | Davidson |
| D571,459 | S | 6/2008 | D'Souza |
| D578,207 | S | 10/2008 | D'Souza |
| D582,547 | S | 12/2008 | Ungar |
| D588,689 | S | 3/2009 | Guney |
| D591,857 | S | 5/2009 | Peake |
| D591,858 | S | 5/2009 | Peake |
| D594,111 | S | 6/2009 | Reid |
| D597,201 | S | 7/2009 | Brambilla |
| 7,559,323 | B2 | 7/2009 | Hacke |
| D600,342 | S | 9/2009 | D'Souza |
| 7,686,018 | B2 | 3/2010 | Cerbini |
| 7,703,456 | B2 | 4/2010 | Yahiaoui |
| 7,725,948 | B2 | 6/2010 | Steindorf |
| 7,802,572 | B2 | 9/2010 | Hahne |
| 7,828,863 | B2 | 11/2010 | Lindstrom |
| D629,885 | S | 12/2010 | Skulley |
| D630,315 | S | 1/2011 | Masters |
| D639,419 | S | 6/2011 | Eves |
| D640,011 | S | 6/2011 | Teng |
| 7,979,273 | B2 | 7/2011 | Haupt |
| D645,558 | S | 9/2011 | Matula |
| 2002/0005198 | A1 | 1/2002 | Kwok |
| 2002/0056450 | A1 | 5/2002 | Lee |
| 2004/0226563 | A1 | 11/2004 | Xu |
| 2004/0255946 | A1 | 12/2004 | Gerson |
| 2004/0261798 | A1 | 12/2004 | Rimkus |
| 2006/0005838 | A1 | 1/2006 | Magidson |
| 2006/0130841 | A1 | 6/2006 | Spence |
| 2006/0130842 | A1 | 6/2006 | Klemen |
| 2006/0174890 | A1 | 8/2006 | Cheng |
| 2006/0266364 | A1 | 11/2006 | Turdjian |
| 2007/0039620 | A1 | 2/2007 | Sustello |
| 2007/0101997 | A1 | 5/2007 | Chiesa |
| 2008/0099022 | A1 | 5/2008 | Gebrewold |
| 2008/0271737 | A1 | 11/2008 | Facer |
| 2009/0000623 | A1 | 1/2009 | Lynch |
| 2009/0283096 | A1 | 11/2009 | Cerbini |
| 2009/0320848 | A1 | 12/2009 | Steindorf |
| 2010/0065058 | A1 | 3/2010 | Ungar |
| 2010/0154805 | A1 | 6/2010 | Duffy |
| 2010/0199995 | A1 | 8/2010 | Howie |
| 2011/0048426 | A1 | 3/2011 | Sleeper |
| 2011/0100370 | A1 | 5/2011 | Rose |
| 2012/0042878 | A1 | 2/2012 | Woo |
| 2012/0125341 | A1 | 5/2012 | Gebrewold |
| 2012/0318272 | A1 | 12/2012 | Ho |

FOREIGN PATENT DOCUMENTS

| | | |
|---|---|---|
| CA | 1296487 | 3/1992 |
| CN | 3638374 | 4/2007 |
| CN | 3650369 | 5/2007 |
| CN | 200994999 | 12/2007 |
| CN | 300716892 | 12/2007 |
| CN | 300719882 | 12/2007 |
| CN | 300885357 | 2/2009 |
| CN | 300891852 | 3/2009 |
| CN | 300894832 | 3/2009 |
| CN | 201260848 | 6/2009 |
| CN | 201260849 | 6/2009 |
| CN | 301035315 | 10/2009 |
| CN | 301058342 | 11/2009 |
| CN | 301058343 | 11/2009 |
| CN | 301068813 | 11/2009 |
| CN | 301068815 | 11/2009 |
| CN | 301073812 | 12/2009 |
| CN | 301100365 | 12/2009 |
| CN | 301131414 | 2/2010 |
| CN | 301131415 | 2/2010 |
| CN | 301131416 | 2/2010 |
| CN | 301141429 | 2/2010 |
| CN | 301141430 | 2/2010 |
| CN | 301168433 | 3/2010 |
| CN | 301177581 | 4/2010 |
| CN | 301204437 | 5/2010 |
| CN | 101791154 | 8/2010 |
| CN | 201543135 | 8/2010 |
| CN | 201754811 | 3/2011 |
| CN | 102008791 | 4/2011 |
| CN | 201798053 | 4/2011 |
| CN | 301555272 | 5/2011 |
| CN | 301613029 | 7/2011 |
| DE | 134327 | 2/1979 |
| EM | 000818208-0001 | 1/2008 |
| EM | 000818208-0002 | 1/2008 |
| EM | 000818208-0003 | 1/2008 |
| EM | 000818208-0004 | 1/2008 |
| EM | 000980248-0001 | 8/2008 |
| EM | 000980248-0002 | 8/2008 |
| EM | 000980248-0003 | 8/2008 |
| EM | 000980248-0004 | 8/2008 |
| EM | 001055669-0002 | 1/2009 |
| EP | 0602425 | 6/1994 |
| EP | 0814871 | 1/1998 |
| EP | 0934704 | 8/1999 |
| EP | 1614361 | 1/2006 |
| EP | 2298096 | 3/2011 |
| GB | 2027802 | 2/1980 |
| GB | 2092009 | 8/1982 |
| GB | 2163056 | 2/1986 |
| GB | 3010663 | 8/2003 |
| GB | 2426498 | 11/2006 |
| GB | 2446374 | 8/2008 |
| JP | H09-239050 | 9/1997 |
| JP | 2001-161843 | 6/2001 |
| JP | 3734660 | 7/2001 |
| JP | 2003-236000 | 8/2003 |
| JP | 2004-337563 | 12/2004 |
| JP | 2006-149739 | 6/2006 |
| JP | 2006-288650 | 10/2006 |
| JP | 2007-020983 | 2/2007 |
| JP | 2008-229217 | 10/2008 |
| JP | 2008-279101 | 11/2008 |
| KR | 2009-0056587 | 6/2009 |
| KR | 2009-0091274 | 8/2009 |
| KR | 2011-0024310 | 3/2011 |
| KR | 2011-0008148 | 8/2011 |
| SE | 454484 | 5/1988 |
| WO | WO 1999-30583 | 6/1999 |
| WO | WO 2003-085242 | 10/2003 |
| WO | WO 2004-101658 | 11/2004 |
| WO | WO 2005-089875 | 9/2005 |

(56) References Cited

FOREIGN PATENT DOCUMENTS

| | | |
|---|---|---|
| WO | WO 2005-089876 | 9/2005 |
| WO | WO 2005-099826 | 10/2005 |
| WO | WO 2006-113163 | 10/2006 |
| WO | WO 2006-113321 | 10/2006 |
| WO | WO 2007-010969 | 1/2007 |
| WO | WO 2009-029349 | 3/2009 |
| WO | WO 2009-029363 | 3/2009 |
| WO | WO 2009-062265 | 5/2009 |
| WO | WO 2010-062893 | 6/2010 |
| WO | WO 2012-068091 | 5/2012 |
| WO | WO 2015-026587 | 2/2015 |
| WO | WO 2015-026588 | 2/2015 |
| WO | WO 2015-026593 | 2/2015 |

PERSONAL RESPIRATORY PROTECTION DEVICE

BACKGROUND

Personal respiratory protection devices, also known as respirators or face masks are used in a wide variety of applications where it is desired to protect the human respiratory system from air borne particulates or noxious or unpleasant gases. Generally such respirators are in either a moulded cup-shape, such as those discussed in U.S. Pat. No. 4,827,924, or flat-folded format, such as those discussed in EP 814 871.

Moulded cup-shaped masks typically comprise at least one layer of a filter media supported by either an inner and/or an outer support shell. A gasket is provided around the inner edge of the cup-shape to ensure a good fit against the face of the wearer. The gasket is usually formed from a flexible material such that it moulds around the facial features of the wearer, providing a seal and good engagement between the mask and the face of the wearer. The quality of the fit of such respirators should be high, since it is essential that as much air as possible passes through the filter media and not around the edges of the respirator in use. Such respirators may also be provided with a valve to aid breathing.

The gasket itself is therefore a key factor in achieving reproducible, reliable fit of the respirator. Given the variation in facial features of wearers the gasket needs to be flexible enough and sized accordingly to fit around many different contours. One problematic area is around the nose of the wearer, where the respirator needs to fit closely and firmly against the skin to ensure minimal movement of the respirator during use as well as an airtight fit. To aid with fit, respirators are typically provided with a nose clip, such as a strip of metal, provided on the outer surface of the respirator and designed to be bent around the nose of the wearer to hold the respirator in place. One alternative to providing a nose-clip is to use a foamed in place gasket that fills the gap around the edge of the nose of the wearer, thus providing an improved fit. Such a solution is discussed in EP 1 614 361, where a rubber-like edge bead is moulded around the edge of the respirator, with deformable flanges included in the nasal region.

However, various issues may still arise with the use of a nose clip or other gasket: firstly, the inclusion of a nose clip may create additional manufacturing costs; secondly, the nose clip may be uncomfortable for some wearers since facial features and sizes vary greatly across the population of wearers; and thirdly, the fit achieved when not using a nose clip may be poorer in general without such close contact between the gasket and the skin of the wearer. Further, where fit is less than ideal, additional problems are encountered by wearers who also require eyewear to perform tasks, such as safety eyewear or prescription eyewear. For example, it may be difficult to wear safety glasses in the correct or a comfortable position if the base of the lenses or the frame impinges on the upper edge of the respirator or gasket. Even if worn in the correct position, a poorly fitting gasket encourages moist breath to escape the respirator and travel under the frame or lens of the eyewear, causing the eyewear to fog.

SUMMARY

It would be desirable therefore to be able to deal with all of these issues by providing a gasket that gives optimum fit for all facial types and sizes, at minimal cost increase compared with current products, or, ideally, at a lower manufacturing cost.

The present invention aims to address at least some of these issues by providing a personal respiratory protection device for use by a wearer, comprising: a respirator body having a periphery, a filter media, forming at least part of the respirator body, and a gasket, the gasket being located at the periphery and extending along at least a portion of its length, wherein the gasket is formed of a flexible elastomeric material and is contoured, the contour comprising a ridge that projects away from the periphery, and wherein the ridge is adapted to be deformable and deform towards the periphery.

The flexibility of the gasket and the contouring create an adaptable structure that conforms easily and fully to the facial features of the wearer. The ridge enables accurate positioning of the gasket across the nose and cheekbones, preventing inward leakage of air during use. By being deformable it is possible to wear eyewear that does not impinge on the gasket, and thus has no detriment on fit or use.

Preferably the device further comprises headband means to secure the personal respiratory device onto a wearer such that the gasket flexes and conforms to the facial features of the wearer. Preferably the headband means are adjustable, such that when the adjustable headband means are adjusted the gasket flexes and conforms to the facial features of the wearer.

Preferably, when the gasket flexes, the ridge deforms towards the periphery and creates an accommodation space. Preferably, the accommodation space is adapted to accommodate eyewear, more preferably, the eyewear does not impinge upon the gasket.

The ridge may be provided with an indent adapted to accommodate the nose of a wearer. The ridge is deformable such that the gasket fits substantially flush against the nose and cheeks of a wearer.

Preferably, the gasket extends along the entire periphery of the respirator body.

Preferably, the gasket fits substantially flush against the nose, cheeks and chin of a wearer. Preferably, the ridge is formed in the region of the gasket that contacts the nose of a wearer during use. Preferably, the contour is substantially V-shaped.

The ridge may be formed from a local increase in thickness of elastomeric material. Preferably, the gasket comprises a thermoplastic elastomer (TPE). The gasket may be injection moulded.

The filter media may be in the form of a cover, and the respirator body may comprise an inner cup shaped support and the filter media is overlaid on the inner cup shaped support. Preferably, the cover and the inner cup shaped support are joined at the periphery of the respirator body. The respirator body may comprise at least two panels.

The device is preferably a maintenance-free respirator device.

Preferably, the gasket comprises a sheet-like elastomeric material. The gasket is preferably provided with an aperture adapted to accommodate the nose and mouth of a wearer.

BRIEF DESCRIPTION OF THE DRAWINGS

The present invention will now be described by way of example only, and with reference to the accompanying drawings, in which.

DETAILED DESCRIPTION

To create an improved fit without the use of nose clips, and to avoid issues resulting from poor fit, such as misting of eyewear, the present invention employs a contoured gasket formed from a vapour impermeable flexible, elastomeric material. The gasket is attached to the periphery of the personal respiratory device, and extends along at least a portion of its length. The contour comprises a ridge that projects away from the periphery. This flexibility enables the gasket to deform around the nose, cheeks and chin of a wearer, ensuring contact with the skin at all points along the gasket and therefore around the periphery of the device where it extends. Preferably the gasket extends along the entire periphery, thus creating an extremely good fit, regardless of the shape and size of the wearers' facial features. The ridge deforms towards the periphery and creates an accommodation space, wherein the accommodation space is adapted to accommodate eyewear. The accommodation space ensures that the eyewear does not impinge upon the gasket.

Figure 1:
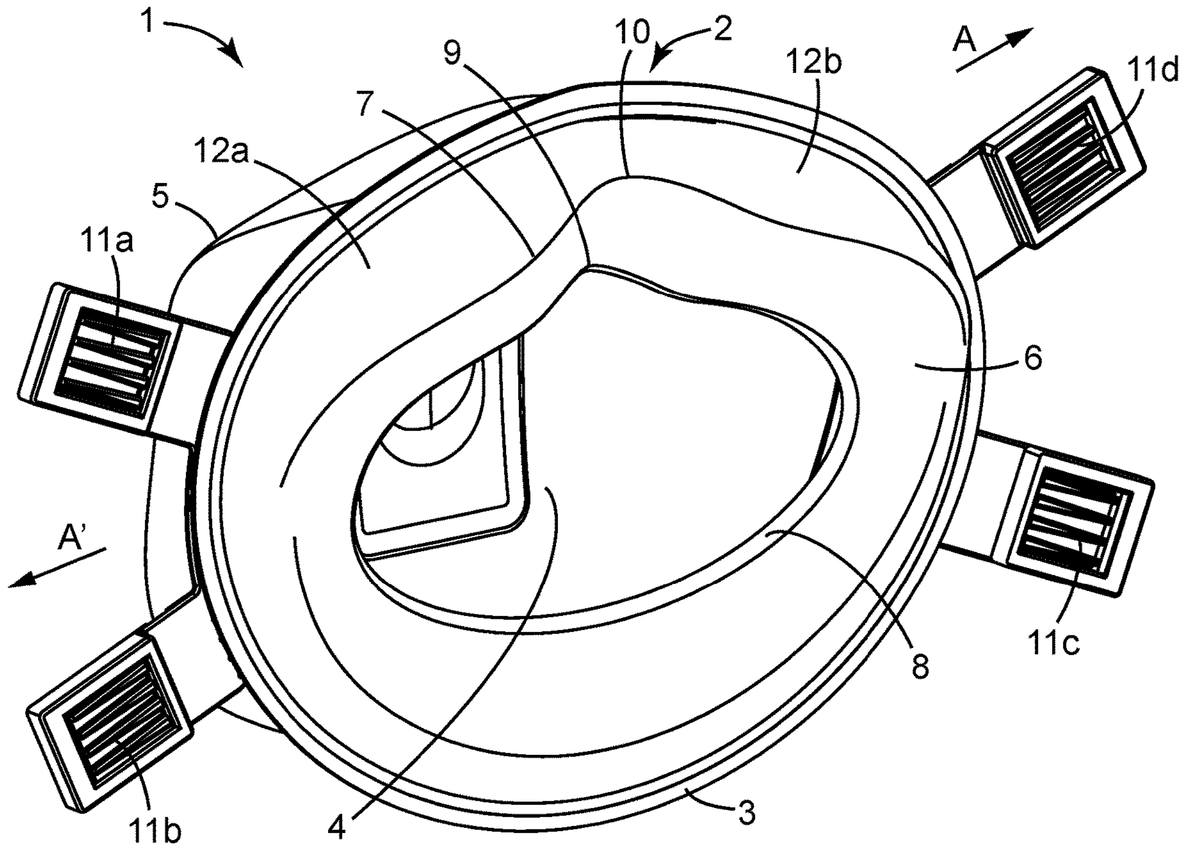
FIG. 1 is a perspective view of a personal respiratory device comprising a gasket in accordance with the present invention.

FIG. 1 is a perspective view of a personal respiratory device comprising a gasket in accordance with the present invention. The personal respiratory device 1 is generally cup-shaped, with a respirator body 2 having a periphery 3, and comprises an inner cup-shaped support 4 and a filter media in the form of an outer cover 5, the filter media being overlaid on the inner cup-shaped support 4, forming at least part of the respirator body 2. A gasket 6 is provided at the periphery 3 of the device 1, and in this embodiment, and extends around the entire periphery 3 of the device 1. The gasket 6 is formed from a vapour impermeable flexible elastomeric material. The gasket 6 is contoured, as illustrated by the contoured region, with the contour comprising a ridge 7 that projects away from the periphery 3. The ridge 7 is adapted to be deformable, and deform towards the periphery 3. In deforming towards the periphery 3, the ridge 7 contacts the facial features of the wearer such that the gasket 6 fits flush against the skin of the wearers' face creating a good fit. The ridge acts as a barrier to exhalation vapours. The ridge is deformable, and preferably forms a cushioning means for the gasket 6. The contour is substantially V-shaped. The ridge 7 is formed in the region of the gasket 6 that contacts the nose of the wearer during use, and is formed from a local increase in thickness of the elastomeric material of the gasket 6. The gasket 6 forms a central aperture 8, substantially elliptical in shape, for receiving the oro-nasal region of the wearer and accommodating the nose and mouth of the wearer, such that the gasket 6 contacts the nose, cheeks and chin of the wearer. At the uppermost point, where, in use, the gasket 6 contacts the bridge of the nose of the wearer, the gasket 6 is provided with an indent 9. The indent 9 is adapted to accommodate the nose of the wearer. A flexion point 10 is disposed on the ridge 7, generally corresponding with the position of the indent 9, such that the indent 9 forms the flexion point 10. The flexion point 10 is formed from a local reduction in thickness of the elastomeric material of the gasket 6. The gasket 6 is adapted to flex about this flexion point 10.

Headband means 11*a-d* are provided to secure the device 1 onto a wearer such that the gasket 6 flexes and conforms to the facial features of the wearer. The headband means 11*a-d* are secured to the device 1 at the periphery 3 by means of ultrasonic welding. An additional lip may be provided at the periphery 3, extending around at least a part, preferably all of, the periphery, forming a base to which the headband means 11*a-d* may be attached, if desired. Preferably the headband means 11*a-d* are welded to the periphery 3, by means of ultrasonic welding, although other suitable and equivalent techniques may be used. The headband means 11*a-d* are adjustable such that when they are adjusted the gasket 6 flexes and conforms to the facial features of the wearer. When the adjustable headband means 11*a-d* are pulled tight, the gasket 6 flexes towards the face of the wearer, about the flexion point 10, pulling the indent 9 into contact with the nose. The headband means 11*a-d* each comprise a plastic buckle, through which a length of elastic material is threaded, and can be pulled through to be lengthened and shortened as desired. Two head bands (not shown) join each of two buckles, the head bands being formed from widths of elastic material. The structure of the buckle prevents easy movement in one direction thus holding the elastic material tightly in position. Alternatively, non-adjustable headband means may be used, such as strips of braided elastic, which may be glued, welded or stapled to the periphery 3.

The region of the gasket 6 at and adjacent the indent 9 contacts the nose and cheeks of the wearer intimately, creating a good fit. This is aided by the ridge 7 being deformable such that the gasket 6 fits substantially flush against the nose and cheeks of the wearer. The ridge 7 forms a cushioning means for the gasket 6, that in use, the ridge deforms against the face of the wearer, creating a cushioning effect such that the facial features are cushioned against the periphery 3. Since the components of the device 1 are welded together, as discussed below, the periphery 3 may feel hard and uncomfortable against the face of the wearer when the adjustable headband means 11*a-d* are pulled tight to create an airtight fit for the device in use. By providing a deformable ridge 7 on the gasket 6 this is effectively avoided such that the device feels comfortable and well-fitting to the wearer regardless of the size and shape of the wearers' facial features. In this example, the gasket 6 extends substantially the entire periphery 3, such that the gasket 6 fits substantially flush against the nose, cheeks and chin of a wearer.

The inner cup-shaped support 4 is preferably formed from a thermally bonded polyester non-woven air-laid staple fibre material, although may optionally be polyolefin, polycarbonate, polyurethane, cellulose or combination thereof fibre material. The outer cover web 5 is preferably formed from spun bond polypropylene bi-component fibre non-woven materials. An inner cover web, not shown, may optionally be provided between the outer cover web 5 and inner cup-shaped support 4, and is preferably also formed from spun bond polypropylene bi-component fibre non-woven material. The inner-cup shaped support 4, outer cover web 5 and gasket 6 are welded together at the periphery 3. Preferably, ultrasonic welding is used, however, thermal and other welding techniques are equally suitable. Although in this embodiment of the present invention an internal cup-shaped support is used, it may be preferable to use a different type of support or for the support to be absent altogether. For example, an external cup-shaped support may be used, with an internal filter layer, forming the respirator body 2.

Figure 2:
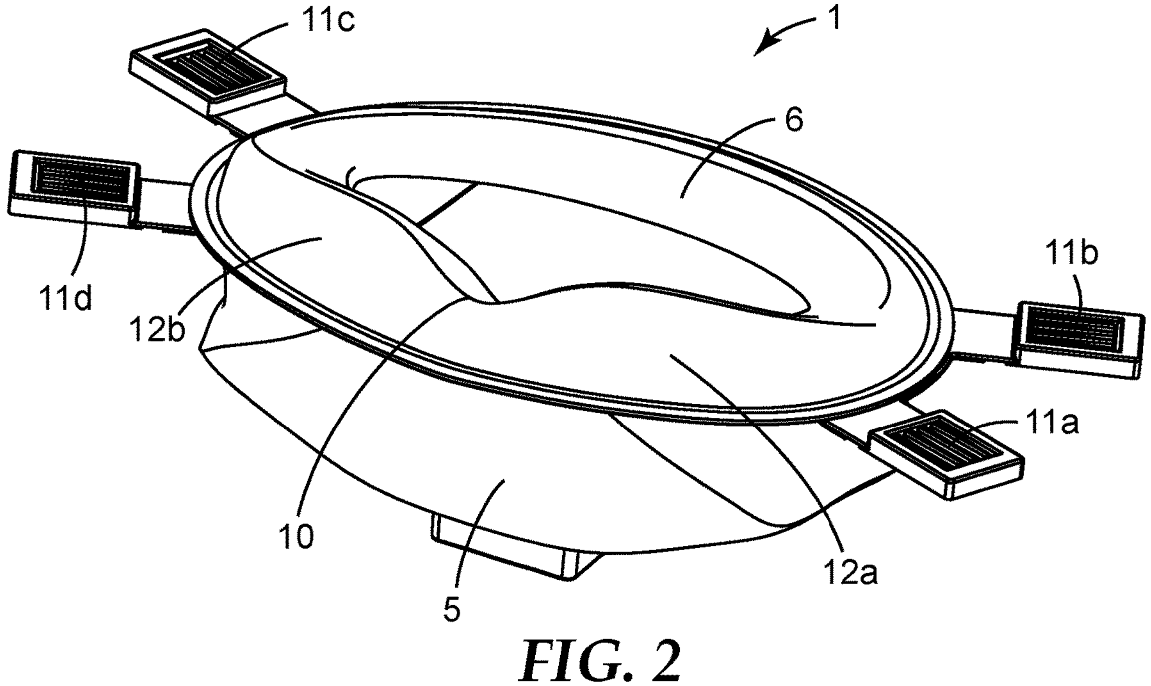
FIG. 2 is a side view of a personal respiratory device comprising a gasket in accordance with the present invention.

FIG. 2 is a side view of a personal respiratory device comprising a gasket in accordance with the present invention. This illustrates the shape of the contour in more detail. The contour is substantially V-shaped, with the apex of the "V" corresponding to the ridge 7. When the headband means 11*a-d* are pulled tight in the direction of arrows A, A', the gasket 6 flexes downwards at the flexion point pushing the regions 12*a*, 12*b* on either side of the flexion point 10 and indent 9 against the cheekbones of the wearer. The portion of the gasket 6 at the periphery 3 opposite the indent 9 is pulled tight against the chin of the wearer simultaneously. This creates an airtight fit around the entire periphery 3 of the device 1.

The gasket 6 is formed from a vapour impermeable flexible elastomeric material, preferably a thermoplastic elastomer (TPE). Suitable materials include Evoprene® G 967 and G 953, both available from AlphaGary Limited, Beler Way, Leicester Road Industrial Estate, Melton Mowbray, Leicestershire LE13 0DG, UK. Preferably the thermoplastic elastomer material is injection moulded to create the gasket 6. A two-part mould is preferably pressure-filled from at least one injection point on the face of the mould, resulting in the final gasket 6 having the at least one injection point on a surface, rather than an edge. Injecting onto the face of the mould, rather than into an edge, results in excellent resistance to tearing and mechanical strength of the finished gasket 6.

Figure 3:
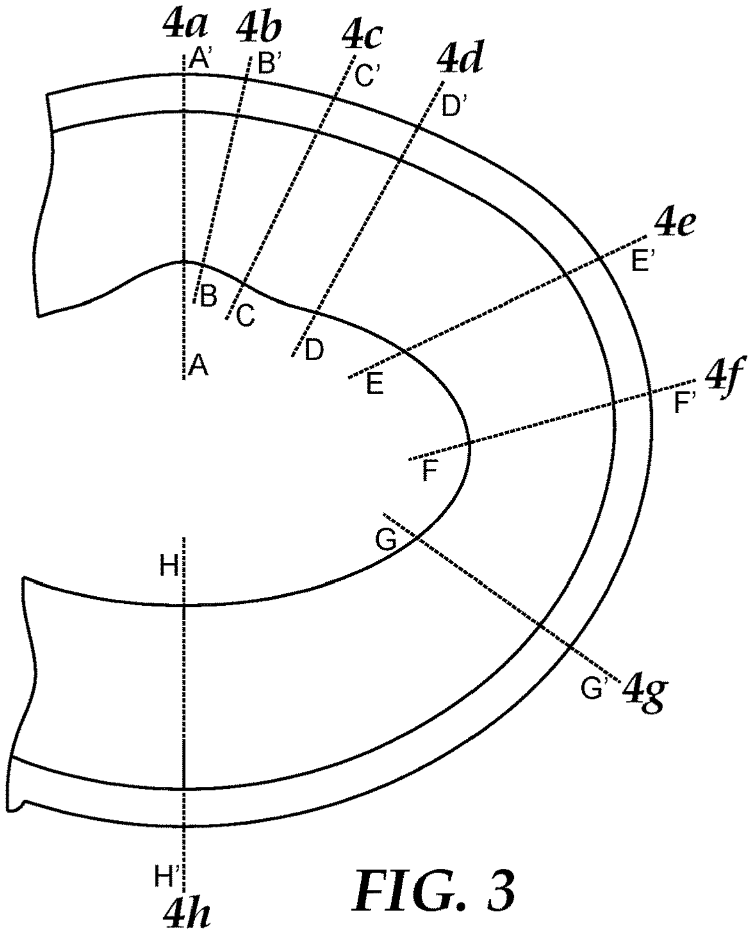
FIG. 3 is a plan view of a gasket indicating a number of cross-sections.
Figures 4A, 4B, 4C, 4D:
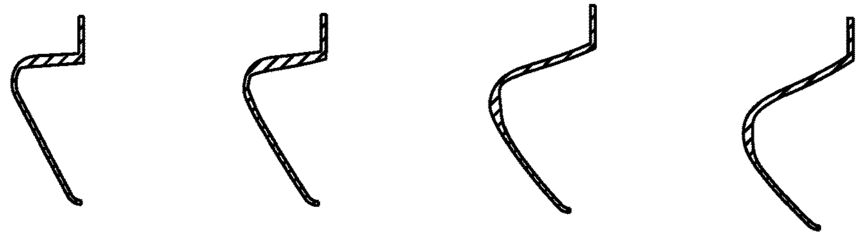
FIG. 4*a* is a cross-section along A-A' in FIG. 3
FIG. 4*b* is a cross-section along B-B' in FIG. 3.
FIG. 4*c* is a cross-section along C-C' in FIG. 3.
FIG. 4*d* is a cross-section along D-D' in FIG. 3.

FIG. 3 is a plan view of a gasket indicating a number of cross-sections. These cross-sections show the contour and ridge 7 in more detail. FIG. 3 shows one half of the gasket 6, and it should be understood that the contouring on the half not shown is a mirror image of that in cross-sections A-A' to H-H'. FIG. 4*a* is a cross-section along A-A' in FIG. 3, and shows the thickness of the gasket 6 at the region of the indent 9 and flexion point 10. Although the nominal thicknesses below are given, these should be understood to be preferred values within a range determined by manufacturing tolerances of ±0.2 mm. In addition, both the nominal values and tolerances may change with the grade and composition of the TPE material used to manufacture the gasket 6.

Figures 4E, 4F, 4G, 4H:
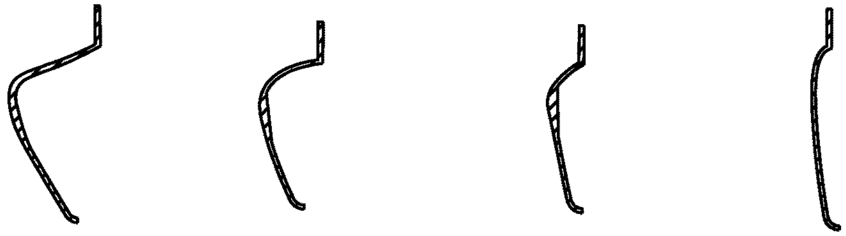
FIG. 4*e* is a cross-section along E-E' in FIG. 3.
FIG. 4*f* is a cross-section along F-F' in FIG. 3.
FIG. 4*g* is a cross-section along G-G' in FIG. 3.
FIG. 4*h* is a cross-section along H-H' in FIG. 3.

The gasket 6 has a nominal thickness of 1.67 mm in the region of the ridge 7, 0.80 mm at the periphery 3 and 0.65 mm at the remainder of the gasket 6. Hence the ridge 7 is formed by a local increase in thickness of the elastomeric material. FIG. 4*b* is a cross-section along B-B' in FIG. 3, and FIG. 4*c* is a cross-section along C-C' in FIG. 3. Here the nominal thickness of the gasket 6 at the ridge 7 is 2.04 mm and 1.73 mm respectively, indicating that the flexion point is formed from a local reduction in thickness of the elastomeric material. The thickness of the material forming the ridge 7 decreases moving away from the indent 9, as indicated in FIGS. 4*d* (1.50 mm) and 4*e* (1.14 mm). Where the ridge 7 is angled towards the periphery 8 at sections F-F' and G-G', as shown in FIGS. 4*f* and 4*g*, the thickness increases slightly (1.34 mm and 1.67 mm respectively), where the gasket 6 contacts the jawbone of the wearer around the edges of the mouth. Finally, the portion of the gasket 6 that fits across the chin of the wearer, as shown at section H-H' in FIG. 4*h*, has approximately the same nominal thickness as the remainder of the gasket away from the ridge 7 and periphery 3, that is 0.65 mm. From FIGS. 4*b* and 4*c* in particular it can be seen how the variation in thickness of the gasket 6 allows it to deform and contact the nose and cheeks of the wearer, yet remain structural enough at the ridge 7 to form an airtight seal. Unlike prior art devices, the gasket comprises a sheet-like elastomeric material, with the performance characteristics being determined by the variations in thickness of the material and contours formed by injection moulding.

Figure 5:
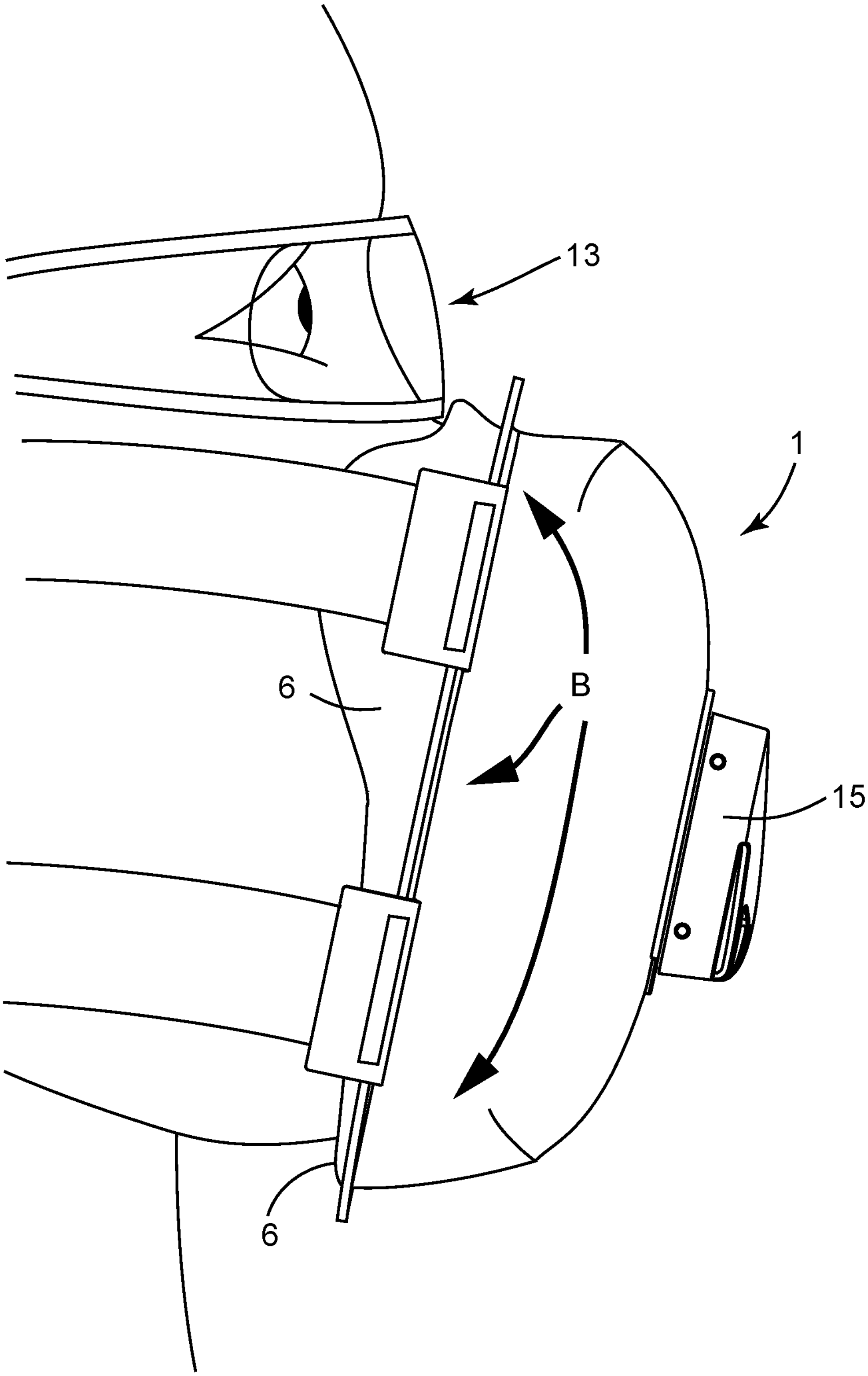
FIG. 5 is a schematic side view of a wearer wearing a personal respiratory protective device in accordance with the present invention in conjunction with eyewear.

The ridge 7 preferably acts as a barrier to exhalation vapours, due to its vapour impermeable nature. This is particularly advantageous for wearers who also need to wear eyewear at the same time as the personal respiratory protection device 1. Since the gasket 6 forms a close fit around the nose and cheeks of the wearer by fitting substantially flush with the nose and cheeks, moist air breathed out by the wearer is substantially prevented from exiting the device 1 around the edges of the gasket 6. As little or no moist air contacts the inner or outer surfaces of eyewear being worn simultaneously with the device 1, fogging or misting of the eyewear does not occur. This is illustrated schematically in FIG. 5. In FIG. 5, eyewear 13 is worn in conjunction with the device 1. The gasket 6 is substantially flush with the cheeks and chin of the wearer. Arrows B indicate the direction of exhaled air within the device 1. It can be seen that when the wearer breathes out, air is prevented from escaping around the gasket 6 by the fit and through the gasket 6 by the use of vapour impermeable flexible elastomeric material to form the gasket 6. Air is therefore forced to flow out of the device 1 via the cover 5 and/or the valve 15.

Figure 6:
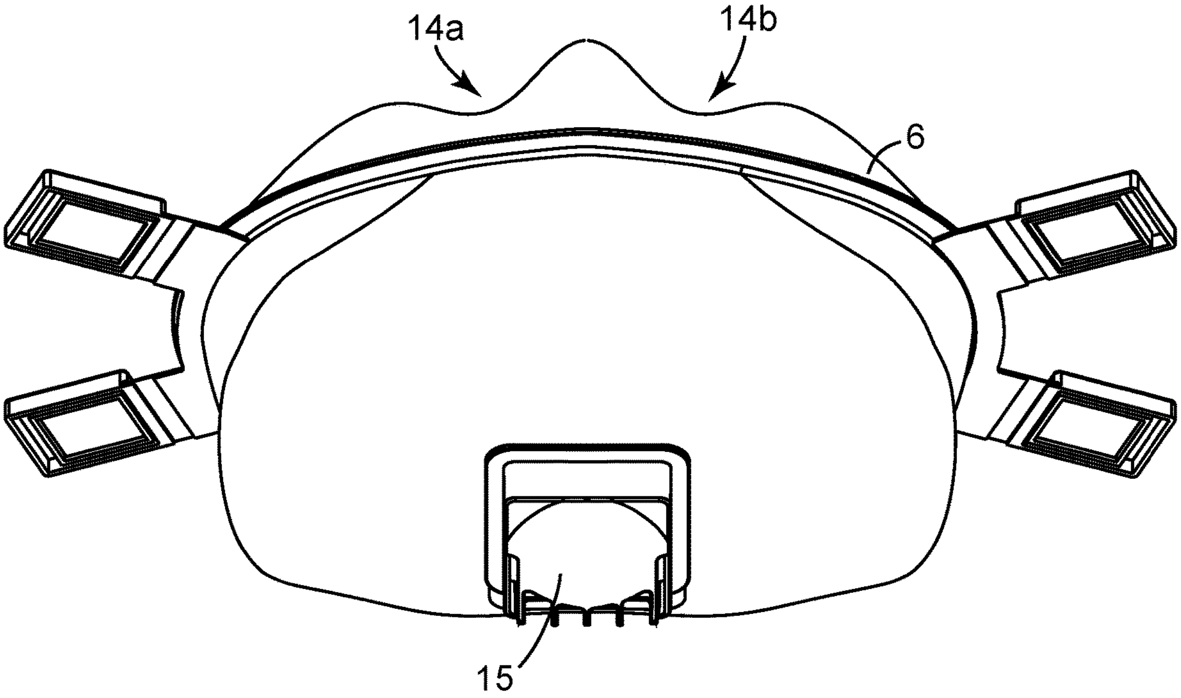
FIG. 6 is a schematic front view illustrating the accommodation space formed by the gasket.

FIG. 6 is a schematic front view illustrating the accommodation space formed by the gasket. The deformation of the gasket 6 also causes the creation of accommodation spaces 14*a* and 14*b* positioned either side of the indent 9 and flexion point 10. The ridge 7 deforms by bending away from the periphery 3, around the nose of the wearer on either side of the indent 9. This creates an accommodation space 14*a*, 14*b* either just on or just under the cheekbone of the wearer (depending on facial shape and size), such that the gasket 6 is no longer sat in the region under the eye socket of the wearer where eyewear 13 is positioned. By preventing contact of the eyewear 13 with the gasket 6, the eyewear sits comfortably in the correct position on the wearers' face. In particular, when the eyewear 13 touches either the gasket 6 or the periphery 3 there is a tendency for the arms of the eyewear 13 to lift up from or sit incorrectly behind the wearers' ears. By providing accommodation spaces 14*a*, 14*b*, this problem is obviated, as the device is free to move as necessary when the gasket 6 flexes during normal facial movement of the wearer, without disrupting the positioning of the eyewear 13.

In the above example, the device 1 is cup-shaped, with the gasket 6 extending along the entire periphery 3 of the respirator body 2. However, it may be desirable to include the gasket on a device that is not cup-shaped. For example, the respirator body 2 may comprise at least two panels, thus forming a flat fold respirator device. Preferably, the device 1 is a maintenance-free respirator device. In either case, the device may also include a valve 15. Alternatively, the respirator may be a reusable respirator.

What is claimed is:

1. Personal respiratory protection device for use by a wearer, comprising:

a respirator body having a periphery, a filter media, forming at least part of the respirator body, and a gasket, the gasket being located at the periphery and extending along at least a portion of its length, where in the gasket forms a central aperture, wherein the gasket is formed of a flexible elastomeric material and is contoured, the contour comprising a ridge and a flexion point disposed on the ridge and formed from a local reduction in thickness of the flexible elastomeric material, wherein the ridge that projects away from the periphery and the central aperture along an entire length of the ridge and the gasket is adapted to flex about the flexion point, wherein at least a portion of the ridge is angled towards the periphery, and further wherein the ridge is adapted to deform against the face of the wearer and towards the periphery.

2. Device of claim 1, further comprising headband means to secure the personal respiratory device onto a wearer such that the gasket flexes and conforms to the facial features of the wearer.

3. Device of claim 2, wherein the headband means are adjustable, such that when the adjustable headband means are adjusted the gasket flexes and conforms to the facial features of the wearer.

4. Device of claim 3, wherein when the gasket flexes, the ridge deforms towards the periphery and creates an accommodation space.

5. Device of claim 4, wherein the accommodation space is adapted to accommodate eyewear.

6. Device of claim 5, wherein the eyewear does not impinge upon the gasket.

* * * * *